W. J. & R. CASE.
Harvester Rake.
No. 49,976.  Patented Sept. 19, 1865.
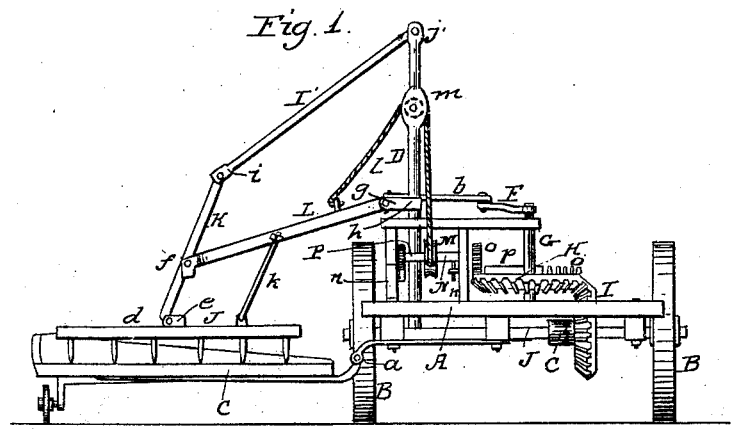
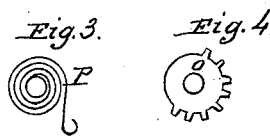
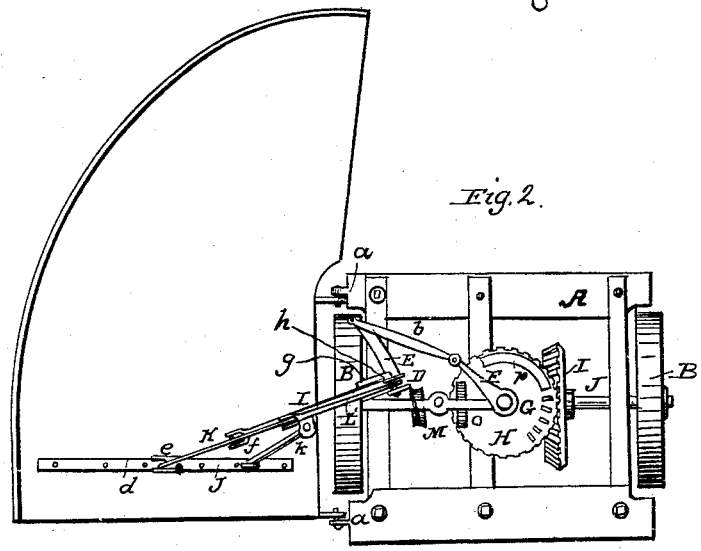

UNITED STATES PATENT OFFICE.

WM. J. CASE AND RHUTSON CASE, OF PITTSTOWN, NEW JERSEY.

IMPROVEMENT IN HARVESTER-RAKES.

Specification forming part of Letters Patent No. 49,976, dated September 19, 1865.

*To all whom it may concern:*

Be it known that we, WILLIAM J. CASE and RHUTSON CASE, of Pittstown, in the county of Hunterdon and State of New Jersey, have invented a new and Improved Raking Device for Harvesters; and we do hereby declare that the following is a full, clear, and exact description thereof, which will enable others skilled in the art to make and use the same, reference being had to the accompanying drawings, forming part of this specification, in which—

Figure 1 is a front view of our invention; Fig. 2, a plan or top view of the same; Figs. 3 and 4, detached views of certain parts pertaining to the same.

Similar letters of reference indicate like parts.

This invention relates to a new and improved automatic raking device for harvesters; and it consists in a novel means employed for operating the rake and in a peculiar arrangement of the same, whereby the cut grain may be raked from the platform without materially increasing the draft of the machine and without interfering with the other working parts thereof.

A represents the main frame of a harvester mounted on two wheels, B B, and having a platform, C, attached to one side of it by joints or hinges a a, both of which are shown in Fig. 2.

D represents an upright shaft, fitted on the frame A in such a manner that it may turn freely. This shaft D has an arm, E, projecting from it, and this arm is connected by a rod, b, with a crank, F, on the upper end of a vertical shaft, G, in the main frame A, which shaft has a bevel-wheel, H, keyed upon it, the wheel H gearing into a corresponding wheel, I, placed loosely on the axle J of the wheels B B, but made to turn with said axle when the machine is drawn forward by means of ratchets c, the ratchets not giving motion to the wheel I when the machine is backed. By this arrangement the shaft D, as the machine is drawn along, is turned first in one direction and then in the other a quarter-revolution.

J represents the rake, the head d of which is connected centrally by a joint, e, to an arm, K, which is secured, by a pivot, f, at the outer end of a bar, L, the inner end of the latter being secured by a pivot, g, to a projection, h, on shaft D. The upper end of the arm K is connected by a pivot, i, to the outer end of a bar, L', the inner end of which is attached by a pivot, j, to the upper end of the shaft D. The rake-head D is also connected by an arm, k, to the bar L. The bar L has a rope, l, attached to it, and this rope passes over a sheave, m, in the shaft D, and extends down and is attached to a pulley, M, on a shaft, N, the bearings of the latter being in uprights n n on the frame A. The shaft N has a part-pinion, O, on its inner end, and the upper surface of the wheel H has a number of teeth, o, upon it, and a smooth ledge, p, which comprises a portion of the same circle as the teeth o, (see Fig. 2,) the ledge and teeth extending around one-half of the circumference of the wheel H.

The operation is as follows: The rake J is drawn or swept over the platform C and in contact therewith from its front to its rear end, and in thus moving rakes the cut grain from the platform. When the rake reaches the rear end of the platform the teeth o on wheel H gear into the teeth of the part-pinion O, which causes the shaft N to be rotated, and the rope l is wound upon the pulley M and the rake raised up free from or above the platform, the rake assuming nearly a vertical position as it is moved forward toward the front end of the platform, and being retained in this position while thus moving in consequence of the smooth portion of the part-pinion O being in contact with the ledge p of wheel H. When the rake reaches the termination of its forward movement the ledge p passes the part-pinion O and the rake descends upon the front part of the platform, said descent being insured by a coil-spring, P, which is wound up as the shaft N is turned during the elevation of the rake.

Thus by this simple means we obtain an efficient automatic raking attachment for harvesters—one which may be constructed and applied at a small cost, and containing no parts liable to get out of repair or become deranged by use. The hinged platform and the pivoting of the rake-head admits of the device conforming to the inequalities of the surface over which the machine may pass.

We claim as new and desire to secure by Letters Patent—

1. The vibrating upright shaft D, with rake J attached to it, as shown, in connection with the rope $l$, connected to the bar L and pulley M on shaft N, all arranged, either with or without the spring P, to operate in the manner substantially as and for the purpose set forth.

2. The arrangement of the wheel H, provided at its upper surface with teeth $o$, and the ledge $p$, in connection with the part-pinion O on shaft N, for the purpose specified.

The above specification of our invention signed by us this 18th day of April, 1865.

WM. J. CASE.
    RHUTSON CASE.

Witnesses:
 M. M. LIVINGSTON,
 I. M. COVINGTON.